(12) United States Patent
Akebono

(10) Patent No.: US 9,026,328 B2
(45) Date of Patent: May 5, 2015

(54) AUTOMATIC TRANSMISSION AND STARTING TIME CONTROL METHOD

(71) Applicant: Jatco Ltd, Fuji-shi, Shizuoka (JP)

(72) Inventor: Hiromichi Akebono, Phoenix, AZ (US)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 14/359,017

(22) PCT Filed: Oct. 4, 2012

(86) PCT No.: PCT/JP2012/075773
§ 371 (c)(1),
(2) Date: May 16, 2014

(87) PCT Pub. No.: WO2013/073307
PCT Pub. Date: May 23, 2013

(65) Prior Publication Data
US 2014/0324307 A1 Oct. 30, 2014

(30) Foreign Application Priority Data

Nov. 18, 2011 (JP) .................................. 2011-252861

(51) Int. Cl.
*G06F 7/00* (2006.01)
*F16H 61/02* (2006.01)
*F16D 48/02* (2006.01)
*F16D 48/06* (2006.01)

(52) U.S. Cl.
CPC ............ *F16H 61/0251* (2013.01); *F16H 61/02* (2013.01); *F16D 48/02* (2013.01); *F16D 48/066* (2013.01); *F16D 48/068* (2013.01); *F16D 2500/10412* (2013.01); *F16D 2500/1045* (2013.01); *F16D 2500/1085* (2013.01); *F16D 2500/3024* (2013.01); *F16D 2500/3056* (2013.01); *F16D 2500/30803* (2013.01)

(58) Field of Classification Search
CPC ..................... B60W 10/02; B60W 2050/0014; B60W 2510/02; B60W 2510/0208; B60W 2510/0216; B60W 2710/02; B60W 2710/021; B60W 2710/023; F16H 2061/0087
See application file for complete search history.

(56) References Cited

U.S. PATENT DOCUMENTS

| 6,328,674 B1 * | 12/2001 | Matsue et al. | ................ 477/155 |
| 2009/0248263 A1 * | 10/2009 | Kubo | ............................... 701/55 |
| 2010/0250074 A1 * | 9/2010 | Hirasako et al. | ................ 701/55 |

FOREIGN PATENT DOCUMENTS

| JP | 06-011026 A | 1/1994 |
| JP | 2003-139235 A | 5/2003 |
| WO | WO 2005/047723 A1 | 5/2005 |

* cited by examiner

*Primary Examiner* — David D Le
(74) *Attorney, Agent, or Firm* — Foley & Lardner LLP

(57) ABSTRACT

A transmission controller increases an indicated hydraulic pressure to a starting frictional engagement element to a normal hydraulic pressure, causes a hydraulic piston to stroke and executes a learning control of the indicated hydraulic pressure so that a time until the starting frictional engagement element starts generating a transmission capacity after the range is switched from the neutral range to the drive range becomes a target time when a range is switched from a neutral range to a drive range. The transmission controller further detects a driver's starting intention and increases the indicated hydraulic pressure to the starting frictional engagement element to a starting time hydraulic pressure higher than the normal hydraulic pressure and prohibits the learning control if the starting intention is detected before the starting frictional engagement element starts generating the transmission capacity.

8 Claims, 3 Drawing Sheets

AUTOMATIC TRANSMISSION AND STARTING TIME CONTROL METHOD

TECHNICAL FIELD

The present invention relates to an automatic transmission and particularly to a control when a vehicle starts.

BACKGROUND ART

A starting frictional engagement element of an automatic transmission is configured by a plurality of input-side and output-side frictional engagement plates arranged offset to each other and a hydraulic piston for displacing these in an engaging direction. When being displaced in the engaging direction by the hydraulic piston, the input-side and output-side frictional engagement plates are pressed against each other to engage the starting frictional engagement element.

When a select lever is operated from a neutral range to a drive range and the starting frictional engagement element is engaged, a hydraulic pressure to be applied to the hydraulic piston is first increased to cause the hydraulic piston to stroke and pre-charging is performed to narrow a clearance between the input-side and output-side frictional engagement plates. A transmission capacity (transmittable torque) of the starting frictional engagement element does not become larger than zero and power transmission is not started before the clearance between the input-side and output-side frictional engagement plates becomes zero.

A time until the transmission capacity of the starting frictional engagement element becomes larger than zero after the select lever is operated from the neutral range to the drive range (hereinafter, referred to as a "start lag") is preferably constant. Thus, in an automatic transmission in which pre-charging is performed, a learning control of a hydraulic pressure to be applied to a hydraulic piston (hereinafter, referred to as a "pre-charge pressure") is usually executed so that the start lag is constant (JP 2003-139235A).

In the learning control, the start lag is measured and the pre-charge pressure is corrected to increase since the pre-charge pressure is insufficient if the measured start lag is shorter than a predetermined target time, whereas the pre-charge pressure is corrected to decrease in an opposite case.

SUMMARY OF INVENTION

Since a vehicle cannot be started during the start lag, the start lag is preferably short. To shorten the start lag, the pre-charge pressure may be increased.

However, if the pre-charge pressure is excessively increased, it leads to a reduction of a line pressure, which serves as a source pressure of the pre-charge pressure, due to an increase in a flow passage volume of a hydraulic circuit caused by a rapid stroke of the hydraulic piston. If the line pressure falls below the required pre-charge pressure, the required pre-charge pressure cannot be ensured and the learning control cannot be correctly executed. Thus, conventionally, the pre-charge pressure can be increased only in such a range as not to cause an excessive reduction of the line pressure and there has been a limit in shortening the start lag.

The present invention was developed in view of such a technical problem and aims to shorten a start lag by increasing a pre-charge pressure if a driver has a starting intension while ensuring a chance of a learning control of the pre-charge pressure in an automatic transmission which executes the learning control.

According to one aspect of the present invention, an automatic transmission is provided which includes a starting frictional engagement element configured by a plurality of friction plates and a hydraulic piston for pressing the friction plates and to be released in a neutral range and to be engaged in a drive range, hydraulic control means configured to increase an indicated hydraulic pressure to the starting frictional engagement element to a normal hydraulic pressure and cause the hydraulic piston to stroke when a range is switched from the neutral range to the drive range, learning control means configured to execute a learning control of the indicated hydraulic pressure so that a time until the starting frictional engagement element starts generating a transmission capacity after the range is switched from the neutral range to the drive range becomes a target time, and starting intention detection means configured to detect a driver's starting intention, wherein the hydraulic control means increases the indicated hydraulic pressure to the starting frictional engagement element to a starting time hydraulic pressure higher than the normal hydraulic pressure and the learning control means prohibits the learning control if the starting intention is detected before the starting frictional engagement element starts generating the transmission capacity.

According to another aspect of the present invention, a starting time control method is provided for an automatic transmission with a starting frictional engagement element configured by a plurality of friction plates and a hydraulic piston for pressing the friction plates and to be released in a neutral range and to be engaged in a drive range. The starting time control method includes a hydraulic control step of increasing an indicated hydraulic pressure to the starting frictional engagement element to a normal hydraulic pressure and causing the hydraulic piston to stroke when a range is switched from the neutral range to the drive range, a learning control step of executing a learning control of the indicated hydraulic pressure so that a time until the starting frictional engagement element starts generating a transmission capacity after the range is switched from the neutral range to the drive range becomes a target time, and a starting intention detection step of detecting a driver's starting intention, wherein the hydraulic control step increases the indicated hydraulic pressure to the starting frictional engagement element to a starting time hydraulic pressure higher than the normal hydraulic pressure and the learning control step prohibits the learning control if the starting intention is detected before the starting frictional engagement element starts generating the transmission capacity.

According to these aspects, a pre-charge pressure can be corrected to increase and start responsiveness can be enhanced in the presence of the driver's starting intention. Although there is a possibility that the learning control of the pre-charge pressure cannot be correctly executed if the pre-charge pressure is corrected to increase, erroneous learning of the pre-charge pressure can be prevented since the learning control is prohibited in such a case.

Further, since the learning control of the pre-charge pressure is executed if the pre-charge pressure is not corrected to increase, a chance of the learning control is also ensured.

An embodiment and advantages of the present invention are described in detail below with reference to the accompanying drawings.

DESCRIPTION OF EMBODIMENT

Figure 1:
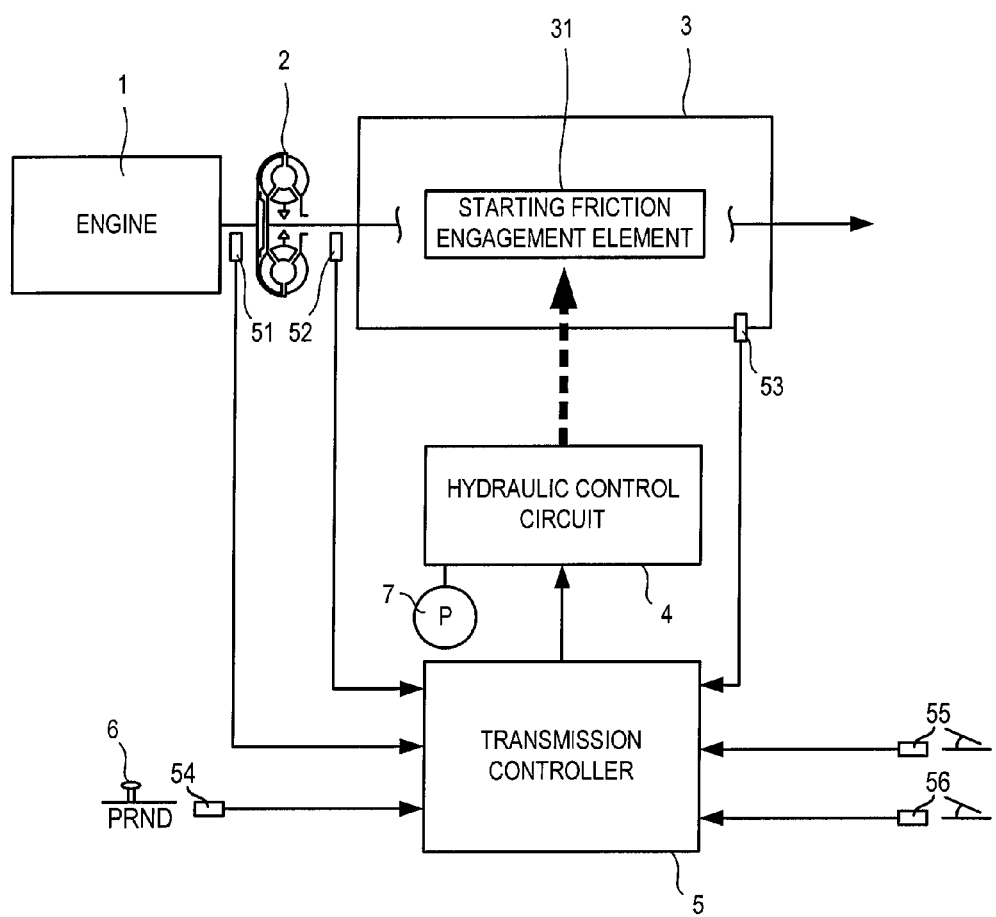
FIG. 1 is a schematic configuration diagram of an automatic transmission according to an embodiment of the present invention.

FIG. 1 shows a schematic configuration of a vehicle equipped with an automatic transmission according to an embodiment of the present invention. The vehicle includes an engine 1, a torque converter 2 and a transmission 3, and output rotation of the engine 1 is transmitted to unillustrated drive wheels via the torque converter 2, the transmission 3 and an unillustrated differential gear unit.

The transmission 3 is a stepped or continuously variable automatic transmission and includes a starting frictional engagement element 31 to be engaged when the vehicle starts.

If the transmission 3 is a planetary gear type stepped transmission configured by a plurality of planetary gears, the starting frictional engagement element 31 is a multi-disk clutch or brake provided in a rotating element constituting the planetary gear. If the transmission is a continuously variable transmission such as a V-belt continuously variable transmission, the starting frictional engagement element 31 is a multi-disk clutch or brake constituting a forward/reverse switching mechanism provided in a preceding stage of a variator (continuously variable transmission). In either case, the starting frictional engagement element 31 is engaged or released by a hydraulic pressure supplied from a hydraulic control circuit 4.

The hydraulic control circuit 4 includes a regulator valve for adjusting a hydraulic pressure from a hydraulic pump 7 driven by the engine 1 to a line pressure, a solenoid valve for adjusting a hydraulic pressure supplied to frictional engagement elements including the starting frictional engagement element 31 (additionally, constituent elements of the continuously variable mechanism if the transmission 3 is the continuously variable mechanism) using the line pressure as a source pressure, and oil passages connecting the hydraulic pump 7, each valve and each frictional engagement element.

Each valve of the hydraulic control circuit 4 is controlled based on a control signal from a transmission controller 5. The transmission controller 5 is composed of a CPU, a ROM, a RAM, an input/output interface and the like, determines a running state of the vehicle based on various signals input from various sensors and an engine controller and outputs a shift command signal to the hydraulic control circuit 4 so that a gear position (speed ratio if the transmission 3 is the continuously variable mechanism) suitable for the running state is realized.

To the transmission controller 5 are input signals from a rotation speed sensor 51 for detecting a rotation speed Ne of the engine 1, a rotation speed sensor 52 for detecting a turbine rotation speed Nt of a torque converter 2 (input rotation speed of the transmission 3), an oil temperature sensor 53 for detecting an oil temperature TMP of the transmission 3, an inhibitor switch 54 for detecting the position of a select lever 6, an accelerator pedal opening sensor 55 for detecting an operated amount of an accelerator pedal (hereinafter, referred to as an "accelerator pedal opening APO") and a brake switch 56 for detecting an ON/OFF state of a brake. It should be noted that the sensors mentioned here are some of the sensors connected to the transmission controller 5.

The select lever 6 is arranged in gates for connecting a parking range (hereinafter, referred to as a "P-range"), a reverse range (hereinafter, referred to as an "R-range"), a neutral range (hereinafter, referred to as an "N-range") and a drive range (hereinafter, referred to as a "D-range") and configured to be movable between the gates. Each range includes a switch to be turned ON when the select lever 6 is in this range and to be turned OFF when the select lever 6 is not in this range, and the inhibitor switch 54 is composed of a plurality of these switches.

The starting frictional engagement element 31 is configured by a plurality of input-side and output-side frictional engagement plates arranged offset to each other and a hydraulic piston for displacing these in an engaging direction, and is engaged or released according to the range selected by the select lever 6. Specifically, the hydraulic pressure supplied to the hydraulic piston is drained to release the starting frictional engagement element 31 in the P-range, the R-range and the N-range, whereas the hydraulic pressure is supplied to the hydraulic piston to engage the starting frictional engagement element 31 in the D-range.

In the case of operating the select lever 6 to the D-range to engage the starting frictional engagement element 31, the transmission controller 5 first performs pre-charging which supplies the hydraulic pressure to the hydraulic piston to stroke and narrows a clearance between the input-side and output-side frictional engagement plates. By this pre-charging, the input-side and the output-side frictional engagement plates are brought into contact and a transmission capacity (transmittable torque) of the starting frictional engagement element 31 becomes larger than zero, whereby the starting frictional engagement element 31 enters a state where the transmission capacity can be immediately increased.

Since a time until the transmission capacity of the starting frictional engagement element 31 becomes larger than zero after the operation of the select lever 6 to the D-range (hereinafter, referred to as a "start lag") is preferably constant, the transmission controller 5 measures the start lag and executes a learning control of the hydraulic pressure to be supplied to the hydraulic piston by pre-charging (hereinafter, referred to as a "pre-charge pressure").

Since causing a start delay of the vehicle, the start lag is preferably short. The pre-charge pressure may be increased to shorten the start lag.

However, if the pre-charge pressure is excessively increased, the hydraulic piston quickly strokes to increase a flow passage volume of a hydraulic circuit, thereby leading to a reduction of the line pressure which serves as the source pressure of the pre-charge pressure. If the line pressure falls below the required pre-charge pressure, the pre-charge pressure also falls (∵ the pre-charge pressure cannot be increased to or above the line pressure as the source pressure). Since the transmission controller 5 cannot determine whether a reduction of the pre-charge pressure is due to individual differences or due to a reduction of the line pressure, the transmission controller 5 cannot correctly execute the learning control under such a situation.

Accordingly, the transmission controller 5 corrects to increase the pre-charge pressure and shortens the start lag in the presence of the driver's starting intention while ensuring a chance of the learning control by executing a starting time control described below.

Figure 2:
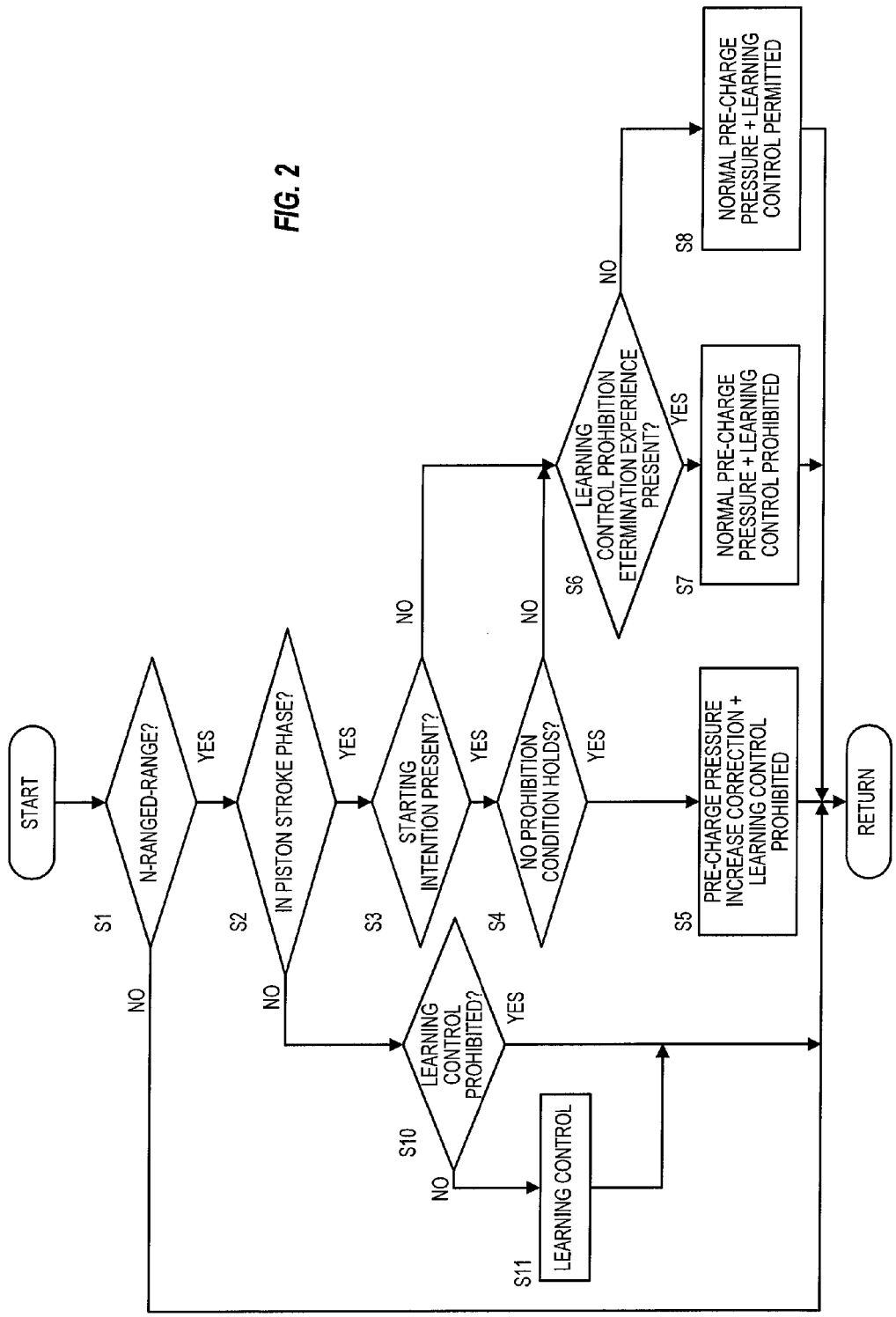
FIG. 2 is a flow chart showing the contents of a starting time control executed by a transmission controller.

FIG. 2 is a flow chart showing the contents of the starting time control executed by the transmission controller 5. The starting time control executed by the transmission controller 5 is described with reference to FIG. 2.

First, in S1, the transmission controller 5 determines whether or not the select lever 6 has been operated from the N-range to the D-range. A process proceeds to S2 if the operation from the N-range to the D-range is determined while being finished if otherwise.

In S2, the transmission controller 5 determines whether or not the starting frictional engagement element 31 is in a piston stroke phase. The piston stroke phase is a phase in which pre-charging is performed to narrow the clearance between the input-side and output-side frictional engagement plates, and a period until the transmission capacity of the starting frictional engagement element 31 becomes larger than zero after the operation of the select lever 6 from the N-range to the D-range.

The end of the piston stroke phase can be determined based on the turbine rotation speed Nt since the turbine rotation speed Nt of the torque converter 2 starts decreasing when the transmission capacity of the starting frictional engagement element 31 becomes larger than zero.

The process proceeds to S3 if the starting frictional engagement element 31 is determined to be in the piston stroke phase while proceeding to S10 if otherwise.

In S3, the transmission controller 5 determines whether or not the driver has a starting intention. The starting intention is determined based on the accelerator pedal opening APO and the ON/OFF state of the brake, and the presence of the starting intention is determined if the accelerator pedal opening APO is larger than 0 or the brake is OFF.

The process proceeds to S4 if the presence of the starting intention is determined while proceeding to S6 if otherwise.

In S4, the transmission controller 5 determines whether or not an increase correction of the pre-charge pressure is prohibited. The increase correction of the pre-charge pressure is prohibited if any one of the following conditions (a) to (c) holds.

(a) Immediately after the start of the engine 1 (an elapsed time from the start of the engine 1 is not longer than a predetermined time required to stabilize the rev-up of the engine 1).

(b) The starting frictional engagement element 31 is not completely released (a selection time of the N-range selected before the selection of the D-range is not longer than a predetermined time required to release the starting frictional engagement element 31 and the range before the selection of the N-range is the D-range).

(c) The rotation speed Ne of the engine 1 is not lower than a predetermined rotation speed.

An oil discharge amount from the hydraulic pump 7 is large immediately after the engine 1 is started and if the rotation speed Ne of the engine 1 is not lower than the predetermined rotation speed. If the increase correction of the pre-charge pressure is performed, the hydraulic piston moves more quickly than expected, the starting frictional engagement element 31 is suddenly engaged and abrupt start feeling of the vehicle becomes strong. Thus, the increase correction of the pre-charge pressure is prohibited in such a case.

Further, also when the starting frictional engagement element 31 is not completely engaged, the starting frictional engagement element 31 is suddenly engaged and abrupt start feeling of the vehicle becomes strong if the increase correction of the pre-charge pressure is performed. Thus, the increase correction of the pre-charge pressure is prohibited.

The process proceeds to S5 if the increase correction of the pre-charge pressure is not prohibited while proceeding to S6 if it is prohibited.

In S5, the transmission controller 5 performs the increase correction of the pre-charge pressure and prohibits the learning control of the pre-charge pressure.

If the increase correction of the pre-charge pressure is not performed, an indicated hydraulic pressure to the starting frictional engagement element 31 is set at a predetermined high hydraulic pressure (hereinafter, referred to as a "normal hydraulic pressure") for a predetermined time and, thereafter, kept at a predetermined low hydraulic pressure lower than the normal hydraulic pressure. Contrary to this, when the increase correction of the pre-charge pressure is performed in S5, the indicated hydraulic pressure to the starting frictional engagement element 31 is set at a starting time hydraulic pressure higher than the normal hydraulic pressure and this hydraulic pressure is kept until the piston stroke phase is finished.

It should be noted that the starting time hydraulic pressure is reduced as the rotation speed Ne of the engine 1 increases. This is to suppress the following situation. If the rotation speed Ne of the engine 1 is high, an acceleration of the vehicle when the piston stroke phase is finished is high and abrupt start feeling of the vehicle becomes strong.

Further, the starting time hydraulic pressure is increased as the oil temperature TMP of the transmission 3 decreases. This is to shorten the start lag by increasing the starting time hydraulic pressure since, if the oil temperature TMP of the transmission 3 is low, the viscosity of the oil is high and a time until the piston stroke phase is finished (start lag) is long. This can provide start responsiveness matching the driver's start request regardless of the oil temperature TMP of the transmission 3.

The learning control of the pre-charge pressure is prohibited in the case of performing the increase correction of the pre-charge pressure because the line pressure decreases and there is a possibility that the learning control of the pre-charge pressure cannot be correctly executed if the increase correction of the pre-charge pressure is performed.

On the other hand, in S6 to which the process proceeds in the absence of the starting intention or assuming that the prohibition condition holds, the transmission controller 5 determines whether or not a learning control prohibition determination has been made after the operation from the N-range to the D-range was determined in S1, i.e. the process has proceeded to S5 to prohibit the learning control.

If the learning control was prohibited even once, it means that the increase correction of the pre-charge pressure has been performed in the past and the line pressure has decreased. Thus, there is a possibility that the learning control can be no longer correctly executed. Therefore, the process proceeds to S7 in the presence of a learning control prohibition determination experience, and the transmission controller 5 prohibits the learning control. Further, the transmission controller 5 does not perform the increase correction of the pre-charge pressure and changes the indicated hydraulic pressure to the normal hydraulic pressure and then to the predetermined low hydraulic pressure.

The process proceeds to S8 in the absence of the learning control prohibition determination experience and the transmission controller 5 does not perform the increase correction of the pre-charge pressure and changes the indicated hydraulic pressure to the normal hydraulic pressure and then to the predetermined low hydraulic pressure. Further, since the line pressure does not decrease and the learning control of the pre-charge pressure is possible in this case, the transmission controller 5 permits the learning control.

The process proceeds from S2 to S10 if the piston stroke phase is finished, and the transmission controller 5 determines whether or not the learning control is prohibited. The process is finished if the learning control is prohibited while proceeding to S11 if it is not prohibited.

In S11, the transmission controller 5 executes the learning control of the pre-charge pressure.

In the learning control, the normal hydraulic pressure is increased and/or a supply time of the normal hydraulic pressure is extended, determining that the pre-charge pressure is insufficient, if the time until the piston stroke phase is finished in S2 after the operation of the select lever from the N-range to the D-range is determined in S1 (start lag, measured using a timer) is longer than a predetermined target time, and the normal hydraulic pressure is reduced and/or the supply time of the normal hydraulic pressure is shortened, determining that the pre-charge pressure is excessive, if the above time is shorter than the target time.

Next, functions and effects brought about by executing the above starting time control are described.

Figure 3:
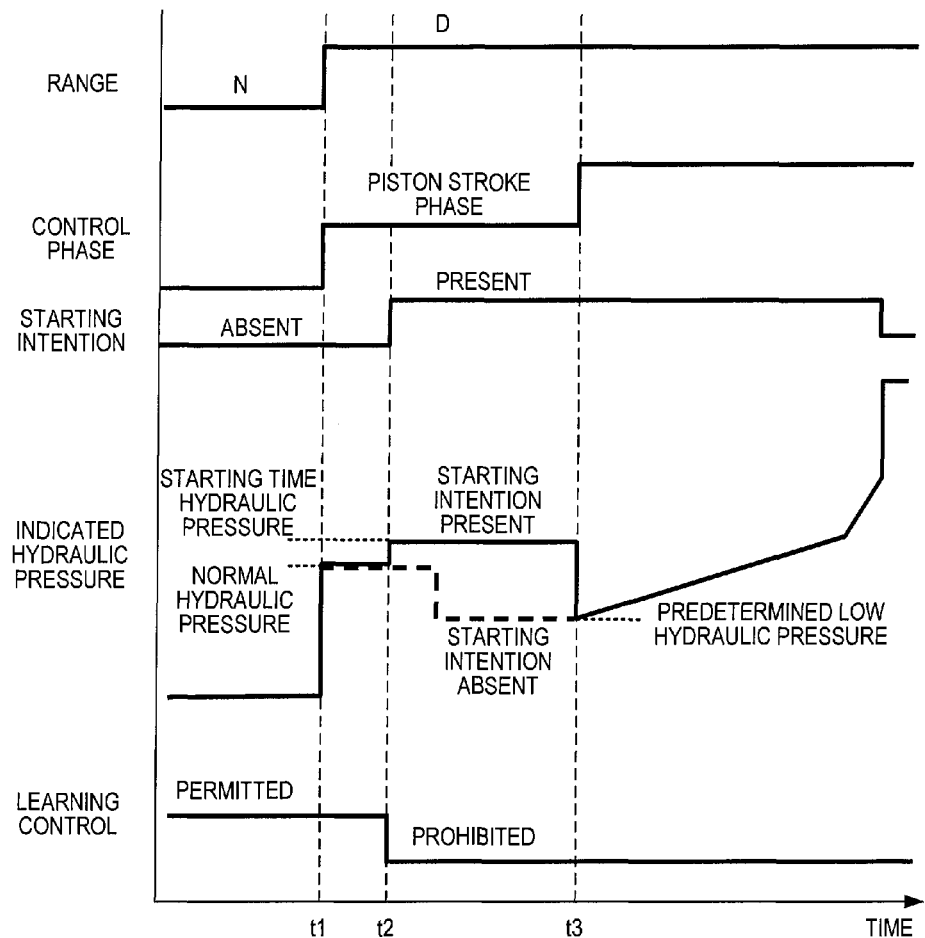
FIG. 3 is a time chart showing functions and effects of the present invention.

FIG. 3 shows a change in the indicated hydraulic pressure when the select lever is operated from the N-range to the D-range and the driver's starting intention is detected based on the depression of the accelerator pedal or the release of a brake pedal during the piston stroke phase.

When the select lever is operated from the N-range to the D-range at time t1, a control phase of the starting frictional engagement element 31 transitions to the piston stroke phase and the indicated hydraulic pressure is increased to the normal hydraulic pressure.

The indicated hydraulic pressure to the starting frictional engagement element 31 changes to the normal hydraulic pressure and then to the predetermined low hydraulic pressure as shown in broken line in FIG. 3 unless the driver's starting intention is detected. This causes the clearance between the input-side and output-side frictional engagement plates constituting the starting frictional engagement element 31 to be narrowed.

Contrary to this, when the starting intention is detected at time t2 as in a shown example, the indicated hydraulic pressure to the starting frictional engagement element 31 is increased to the starting time hydraulic pressure higher than the normal hydraulic pressure at that timing and kept until time t3 at which the piston stroke phase is finished.

This accelerates the engagement of the starting frictional engagement element 31 and can realize start responsiveness matching the driver's starting intention.

If the indicated hydraulic pressure is increased and the pre-charge pressure is corrected to increase, it leads to a reduction of the line pressure and the learning control cannot be correctly executed. Thus, in this case, the learning control is prohibited (time t2) and is not executed.

Although the learning control is prohibited if the driver's starting intention is detected during the piston stroke phase in this way, a chance of the learning control of the pre-charge pressure is ensured since the learning control is executed if the driver's starting intention is not detected during the piston stroke phase.

Thus, according to the present embodiment, it is possible to enhance start responsiveness by correcting the pre-charge pressure to increase in the presence of the driver's start request while ensuring a chance of the learning control of the pre-charge pressure.

Further, it can be prevented that abrupt start feeling of the vehicle becomes strong by reducing the starting time hydraulic pressure as the rotation speed Ne of the engine 1 increases. Start responsiveness matching the driver's start request can be obtained regardless of the oil temperature TMP of the transmission 3 by increasing the starting time hydraulic pressure as the oil temperature TMP of the transmission 3 decreases.

Further, the indicated hydraulic pressure to the starting frictional engagement element 31 is not increased to the starting time hydraulic pressure and kept at the normal hydraulic pressure if the rotation speed Ne of the engine 1 is higher than the predetermined high rotation speed, immediately after the engine 1 is started and if the starting frictional engagement element 31 is not released. This can prevent abrupt start feeling of the vehicle from becoming strong due to the sudden engagement of the starting frictional engagement element 31.

Although the embodiment of the present invention has been described above, the above embodiment is merely one application example of the present invention and not intended to limit the technical scope of the present invention to the specific configuration of the above embodiment.

For example, although the indicated hydraulic pressure to the starting frictional engagement element 31 is set at the starting time hydraulic pressure higher than the normal hydraulic pressure and kept at this hydraulic pressure until the piston stroke phase is finished in the above embodiment in the case of performing the increase correction of the pre-charge pressure, the starting time hydraulic pressure may be kept for a predetermined time and, thereafter, the predetermined low hydraulic pressure may be kept.

This application claims a priority based on Japanese Patent Application No. 2011-252861 filed with the Japan Patent Office on Nov. 18, 2011, all the contents of which are hereby incorporated by reference.

The invention claimed is:

1. An automatic transmission, comprising:
   a starting frictional engagement element configured by a plurality of friction plates and a hydraulic piston for pressing the friction plates and to be released in a neutral range and to be engaged in a drive range;
   a hydraulic control unit configured to increase an indicated hydraulic pressure to the starting frictional engagement element to a normal hydraulic pressure and cause the hydraulic piston to stroke when a range is switched from the neutral range to the drive range;
   a learning control unit configured to execute a learning control of the indicated hydraulic pressure so that a time until the starting frictional engagement element starts generating a transmission capacity after the range is switched from the neutral range to the drive range becomes a target time; and
   a starting intention detection unit configured to detect a driver's starting intention;
   wherein the hydraulic control unit increases the indicated hydraulic pressure to the starting frictional engagement element to a starting time hydraulic pressure higher than the normal hydraulic pressure and the learning control unit prohibits the learning control if the starting intention is detected before the starting frictional engagement element starts generating the transmission capacity.

2. The automatic transmission according to claim 1, wherein:
   the hydraulic pressure to be supplied to the starting frictional engagement element is generated by a hydraulic pump driven by an engine; and
   the hydraulic control unit reduces the starting time hydraulic pressure as a rotation speed of the engine increases.

3. The automatic transmission according to claim 1, wherein:
   the hydraulic control unit increases the starting time hydraulic pressure as an oil temperature of the automatic transmission decreases.

4. The automatic transmission according to claim 1, wherein:
   the hydraulic pressure to be supplied to the starting frictional engagement element is generated by a hydraulic pump driven by an engine; and
   the hydraulic control unit keeps the indicated hydraulic pressure to the starting frictional engagement element at the normal hydraulic pressure without increasing the indicated hydraulic pressure to the starting time hydraulic pressure if a rotation speed of the engine is higher than a predetermined high rotation speed.

5. The automatic transmission according to claim 1, wherein:
the hydraulic pressure to be supplied to the starting frictional engagement element is generated by a hydraulic pump driven by an engine; and
the hydraulic control unit keeps the indicated hydraulic pressure to the starting frictional engagement element at the normal hydraulic pressure without increasing the indicated hydraulic pressure to the starting time hydraulic pressure immediately after the engine is started.

6. The automatic transmission according to claim 1, wherein:
the hydraulic control unit keeps the indicated hydraulic pressure to the starting frictional engagement element at the normal hydraulic pressure without increasing the indicated hydraulic pressure to the starting time hydraulic pressure if the starting frictional engagement element is not completely released when the range is switched from the neutral range to the drive range.

7. A starting time control method for an automatic transmission with a starting frictional engagement element configured by a plurality of friction plates and a hydraulic piston for pressing the friction plates and to be released in a neutral range and to be engaged in a drive range, comprising:
a hydraulic control step of increasing an indicated hydraulic pressure to the starting frictional engagement element to a normal hydraulic pressure and causing the hydraulic piston to stroke when a range is switched from the neutral range to the drive range;
a learning control step of executing a learning control of the indicated hydraulic pressure so that a time until the starting frictional engagement element starts generating a transmission capacity after the range is switched from the neutral range to the drive range becomes a target time; and
a starting intention detection step of detecting a driver's starting intention;
wherein the hydraulic control step increases the indicated hydraulic pressure to the starting frictional engagement element to a starting time hydraulic pressure higher than the normal hydraulic pressure and the learning control step prohibits the learning control if the starting intention is detected before the starting frictional engagement element starts generating the transmission capacity.

8. An automatic transmission, comprising:
a starting frictional engagement element configured by a plurality of friction plates and a hydraulic piston for pressing the friction plates and to be released in a neutral range and to be engaged in a drive range;
hydraulic control means for increasing an indicated hydraulic pressure to the starting frictional engagement element to a normal hydraulic pressure and causing the hydraulic piston to stroke when a range is switched from the neutral range to the drive range;
learning control means for executing a learning control of the indicated hydraulic pressure so that a time until the starting frictional engagement element starts generating a transmission capacity after the range is switched from the neutral range to the drive range becomes a target time; and
starting intention detection means for detecting a driver's starting intention;
wherein the hydraulic control means increases the indicated hydraulic pressure to the starting frictional engagement element to a starting time hydraulic pressure higher than the normal hydraulic pressure and the learning control means prohibits the learning control if the starting intention is detected before the starting frictional engagement element starts generating the transmission capacity.

* * * * *